(12) United States Patent
Kambegawa

(10) Patent No.: US 10,516,789 B2
(45) Date of Patent: Dec. 24, 2019

(54) INFORMATION PROCESSING APPARATUS AND IMAGE PROCESSING APPARATUS THAT PERFORM TRANSMISSION AND RECEPTION OF DATA, AND METHOD OF CONTROLLING INFORMATION PROCESSING APPARATUS

(71) Applicant: CANON KABUSHIKI KAISHA, Tokyo (JP)

(72) Inventor: Minoru Kambegawa, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/132,884

(22) Filed: Sep. 17, 2018

(65) Prior Publication Data

US 2019/0104218 A1 Apr. 4, 2019

(30) Foreign Application Priority Data

Oct. 2, 2017 (JP) .................................. 2017-192737

(51) Int. Cl.
*H04N 1/00* (2006.01)
*H04L 1/16* (2006.01)
*H04L 1/18* (2006.01)

(52) U.S. Cl.
CPC ......... *H04N 1/0001* (2013.01); *H04L 1/1621* (2013.01); *H04L 1/1803* (2013.01); *H04L 1/1829* (2013.01); *H04L 1/1867* (2013.01); *H04N 1/00034* (2013.01); *H04N 1/00068* (2013.01)

(58) Field of Classification Search
CPC ............. H04N 1/0001; H04N 1/00034; H04N 1/00068; H04L 1/1621

USPC ........................................................ 358/1.15
See application file for complete search history.

(56) References Cited

U.S. PATENT DOCUMENTS

| 7,126,935 B1* | 10/2006 | Brown | ............... G06K 7/10851 |
| | | | 370/349 |
| 2011/0066698 A1* | 3/2011 | Takeo | ..................... H04L 41/06 |
| | | | 709/217 |

FOREIGN PATENT DOCUMENTS

| JP | S59198039 A | 11/1984 |
| JP | H1056480 A | 2/1998 |
| JP | 2008301407 A | 12/2008 |

(Continued)

OTHER PUBLICATIONS

Office Action issued in Japanese Appln No. 2017-192737 dated Jun. 25, 2019.

*Primary Examiner* — Saeid Ebrahimi Dehkordy
(74) *Attorney, Agent, or Firm* — Rossi, Kimms & McDowell LLP

(57) ABSTRACT

A information processing apparatus capable of avoiding deadlock between transmission and reception operations of data. A transmission section transmits a data block including a predetermined amount of data and a sequence number. A reception section receives the data block. A packet inspection controller of the reception section determines whether the received data block is correct or wrong, based on a result of detection of an error in the data and a result of comparison between an expected value of the sequence number and a value of the sequence number included in the data block. The expected value of the sequence number is changed to a next value when it is determined that the data block is wrong a predetermined number of times.

10 Claims, 8 Drawing Sheets

(56) References Cited

FOREIGN PATENT DOCUMENTS

JP 2017528957 A 9/2017

\* cited by examiner

INFORMATION PROCESSING APPARATUS AND IMAGE PROCESSING APPARATUS THAT PERFORM TRANSMISSION AND RECEPTION OF DATA, AND METHOD OF CONTROLLING INFORMATION PROCESSING APPARATUS

BACKGROUND OF THE INVENTION

Field of the Invention

The present invention relates to an information processing apparatus and an image processing apparatus, and a method of controlling the information processing apparatus, and more particularly to an information processing apparatus and an image processing apparatus that perform transmission and reception of data, and a method of controlling the information processing apparatus.

Description of the Related Art

Conventionally, there has been known an error control method that eliminates a reception error caused by a transmission error of packet data (hereinafter simply referred to as the "packet") (see. e.g. Japanese Laid-Open Patent Publication (Kokai) No. S59-198039). More specifically, information processing apparatuses at respective transmitting and receiving ends transmit and receive packets according to the following protocol. First, the information processing apparatus at the transmitting end generates a packet to which a sequence number and an error correction code are added (set), on a predetermined data unit basis, transmits the generated packet to the information processing apparatus at the receiving end, and also holds the packet in a predetermined buffer provided in the information processing apparatus at the transmitting end. The information processing apparatus at the receiving end transmits a notification for requesting retransmission only with respect to a packet determined to have resulted in a reception error. In a case where a retransmission request notification is received from the information processing apparatus at the receiving end, the information processing apparatus at the transmitting end retransmits the corresponding packet held in the predetermined buffer in response to this request. Note that the sequence number represents the order of generation of a packet.

According to the above-described protocol, conventionally, in a case where the information processing apparatus at the receiving end suffers from a reception error of a packet, the information processing apparatus at the transmitting end retransmits the packet, thereby eliminating the reception error of the packet.

However, for example, in a case of occurrence of a reception error of a first packet whose sequence number is 1, noise can be sometimes superimposed on a signal of a retransmission request notification sent from the information processing apparatus at the receiving end. In this case, according to the error control method based on the protocol described in Japanese Laid-Open Patent Publication (Kokai) No. S59-198039, it is impossible for the information processing apparatus at the transmitting end to recognize the reception error of the first packet, so that the protocol for transmission and reception becomes ineffective.

More specifically, the information processing apparatus at the transmitting end recognizes that a reception error has not occurred with respect to the first packet whose sequence number is 1 because the above-mentioned retransmission request notification has not been received, and transmits a second packet whose sequence number is 2 as the next packet. On the other hand, although the information processing apparatus at the receiving end is waiting for the first packet, which is to be retransmitted, it receives the second packet, and hence the information processing apparatus at the receiving end determines that a reception error has occurred. Therefore, the information processing apparatus at the receiving end transmits the retransmission request notification again, but the information processing apparatus at the transmitting end retransmits the second packet in response to this request. As a result, deadlock in which retransmission of the packet and recognition of the reception error are repeated is caused between transmission and reception operations.

Here, according to Japanese Laid-Open Patent Publication (Kokai) No. S59-198039, the information processing apparatus at the receiving end sends the retransmission request notification (signal indicative of occurrence of a reception error) with respect to a packet determined to have caused a reception error to the information processing apparatus at the transmitting end. However, even when the information processing apparatus at the receiving end is configured to transmit a signal indicative of non-occurrence of a reception error to the information processing apparatus at the transmitting end in a case where a packet is correctly received, a similar problem of deadlock can be caused. Further, in a transmission and reception system provided in one information processing apparatus, for example, in an ASIC which performs image processing within an MFP, transmission and reception of a packet between a plurality of image processing modules within the ASIC, as well, can suffer from the similar problem.

SUMMARY OF THE INVENTION

The present invention provides an information processing apparatus, an image processing apparatus, and a method of controlling the information processing apparatus, which are capable of avoiding deadlock between transmission and reception operations, which is caused in a case where a signal indicative of occurrence or non-occurrence of a reception error of a packet is unnecessarily generated or lost due to noise on a transmission line.

In a first aspect of the present invention, there is provided an information processing apparatus comprising a transmission unit configured to transmit a data block including a predetermined amount of data and a sequence number, a reception unit configured to receive the data block transmitted from the transmission unit, a storage unit configured to store a value of a counter, a determination unit configured to determine whether the data block received by the reception unit is correct or wrong, based on a result of detection of an error in the data included in the data block received by the reception unit and a result of comparison between the value of the counter and a value of the sequence number included in the data block received by the reception unit, a first change unit configured to change the value of the counter stored in the storage unit to a next value, according to determination by the determination unit, and a second change unit configured to change the value of the counter stored in the storage unit to a next value, in a case where the determination unit determines that the data block is wrong a predetermined number of times.

In a second aspect of the present invention, there is provided an image processing apparatus comprising a data transmitting module which sets a sequence number to a data block, and transmits the data block to which the sequence number has been set, and a data receiving module which stores an expected value of the sequence number having been set to the data block received from the data transmitting module, receives, from the data transmitting module, the data block to which the sequence number has been set by the data transmitting module, and determines whether the data block received from the data transmitting module is correct or wrong based on at least comparison between a value of the sequence number having been set to the received data block and the stored expected value of the sequence number, wherein the data transmitting module can retransmit, to the data receiving module, the same data block to which the sequence number having the same value has been set, and wherein the data receiving module updates the stored expected value of the sequence number to a next expected value of the sequence number having been set to the next data block, if determining, based on the stored expected value of the sequence number, that at least two data blocks having been received from the data transmitting module are wrong respectively.

In a third aspect of the present invention, there is provided a method of controlling an information processing apparatus, comprising transmitting a data block including a predetermined amount of data and a sequence number, receiving the transmitted data block, determining whether the data block is correctly received, based on a result of detection of an error in data included in the received data block and a result of comparison between a value of a counter stored in a storage unit and a value of the sequence number included in the received data block, counting up the value of the counter stored in the storage unit by a predetermined value, according to said determining, and counting up the value of the counter stored in the storage unit by a predetermined value, in a case where it is determined by said determining a predetermined number of times that the data block is not correctly received.

According to the present invention, it is possible to avoid deadlock between transmission and reception operations, which is caused in a case where a signal indicative of occurrence or non-occurrence of a reception error of a packet is unnecessarily generated or lost due to noise on a transmission line.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

The following description will be given of a transmission and reception system as an information processing apparatus of the present invention. Here, the transmission and reception system is not particularly limited, insofar as it is a system that transmits and receives packets, and for example, it can be applied to an ASIC that is included in an MFP and performs image processing. In this case, a transmission section 101 and a reception section 102, described hereinafter with reference to FIG. 1, correspond to a transmitting end module and a receiving end module, out of a plurality of image processing modules included in the ASIC, respectively.

Figure 1:
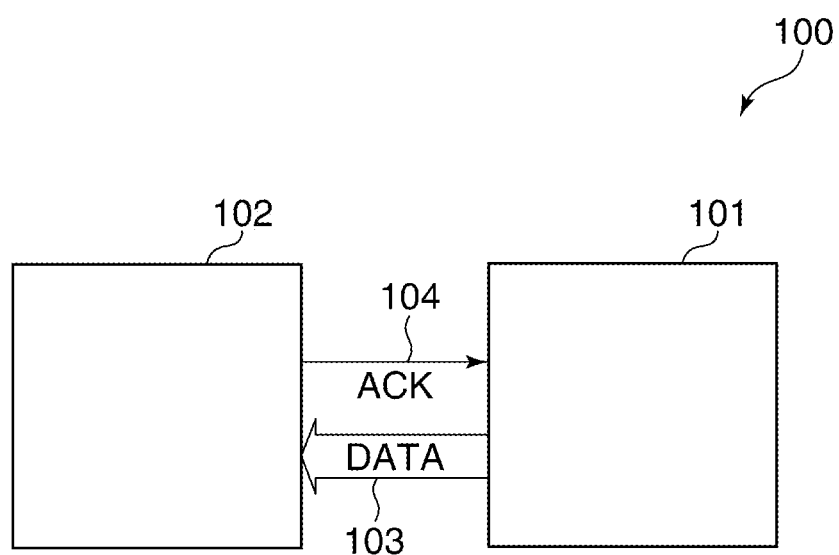
FIG. 1 is a block diagram of a transmission and reception system as an information processing apparatus according to a first embodiment of the present invention.

FIG. 1 is a block diagram of a transmission and reception system 100 as an information processing apparatus according to a first embodiment of the present invention.

The transmission and reception system 100 is formed by the transmission section 101 and the reception section 102. Reference numeral 103 denotes a data transmission line for causing the reception section 102 to receive packet data (hereinafter simply referred to as the "packet") transmitted from the transmission section 101. Reference numeral 104 denotes an ACK transmission line for transmitting an ACK (acknowledgment) signal that notifies, in a case where a transmitted packet has been received by the reception section 102 correctly (without an error), that the packet has been correctly received. In the present embodiment, packets refers to respective data items formed by dividing data into blocks each having a predetermined data amount.

Figure 2:
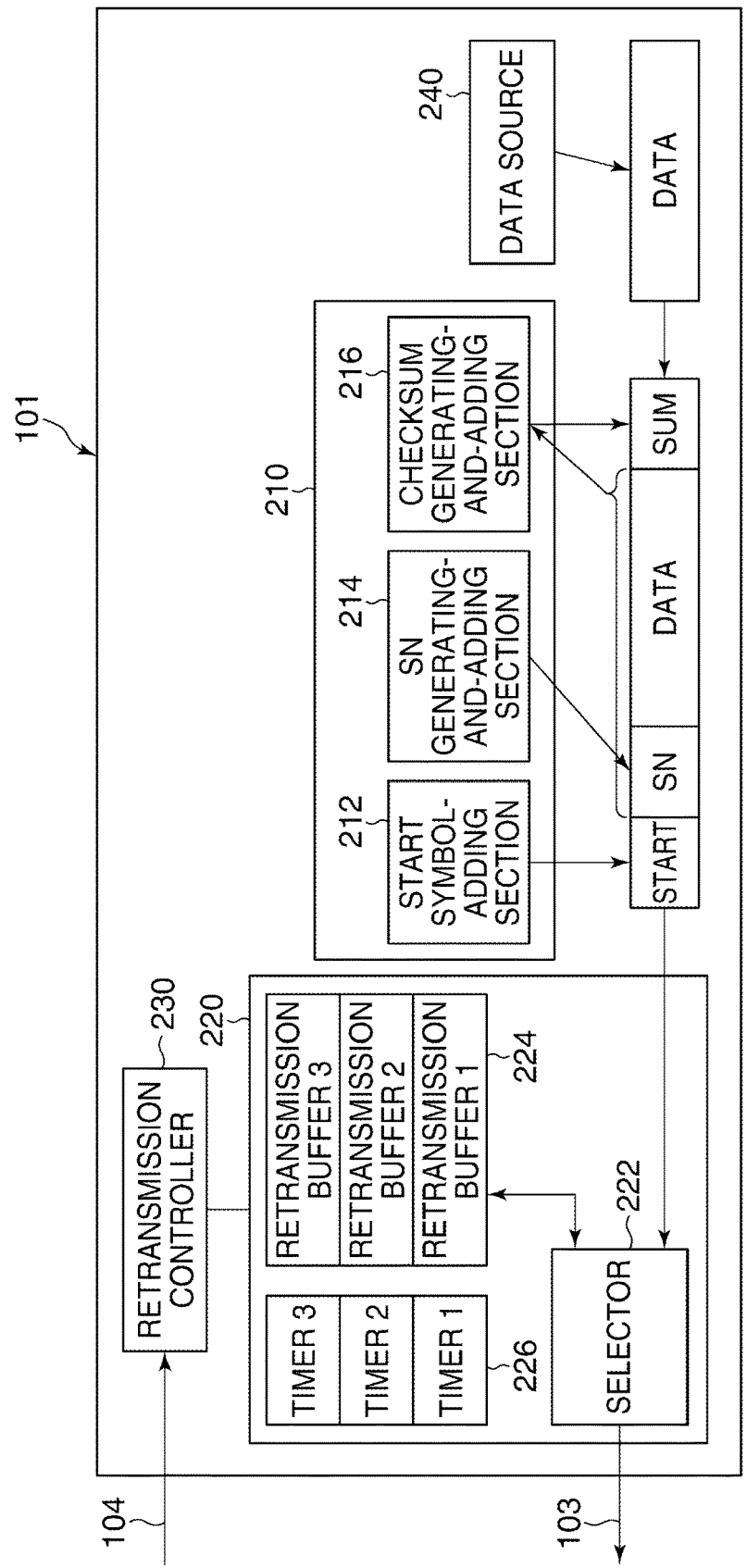
FIG. 2 is a block diagram of a transmission section of the transmission and reception system shown in FIG. 1.

FIG. 2 is a block diagram of the transmission section 101 of the transmission and reception system 100 shown in FIG. 1.

Data supplied from a data source 240 is divided into predetermined data units, and a start symbol, a sequence number, and a checksum are added to each data unit by a packet generation section 210, whereby a packet is generated. A start symbol-adding section 212 of the packet generation section 210 sets a start symbol which indicates the start of the packet at the leading end position of the packet. An SN generating-and-adding section 214 holds a sequence number (SN) having a fixed bit length, which indicates the order of generation of each packet transmitted from the transmission section 101, and sets the sequence number at a position after the start symbol of the packet. The fixed bit length of the sequence number set in the present embodiment is 8 bits, and hence a value set after the start symbol of a packet as the sequence number assumes 0, 1, 2, 3, . . . , 254, 255, 0, 1, . . . in a cyclical manner One of a data item in the form of the predetermined data unit is set at a position after the sequence number. A checksum generating-and-adding section 216 calculates a value by repeatedly adding, to a value of the sequence number set in the packet, a value of each of data segments each having a predetermined size (two bytes in the present embodiment) of the data unit set in the packet and, and adds e.g. two least-significant bytes of the calculated value, immediately after the data unit, as an error detection code (checksum). Note that although in the present embodiment, the error detection code calculated as described above is used as the checksum of a packet, this is not limitative. For example, CRC (Cyclic Redundancy Check Code) may be used as the checksum of a packet.

A packet generated by the packet generation section 210 is delivered from a retransmission section 220 to the reception section 102 as an external apparatus via the data transmission line 103. The retransmission section 220 is controlled by a retransmission controller 230.

The following description will be given of details of the operation of the retransmission section 220.

A packet input to the retransmission section 220 is output to the data transmission line 103 via a selector 222, and is held by a retransmission buffer unit 224 in preparation for retransmission in the future. The retransmission buffer unit 224 is comprised e.g. of three retransmission buffers 1 to 3 (hereinafter simply referred to as "Buffer 1 to Buffer 3"), and Buffer 1 to Buffer 3 are each sequentially assigned with one packet. A timer unit 226 has Timer 1, Timer 2, and Timer 3 associated with Buffer 1 to Buffer 3, respectively. Timer 1 to Timer 3 each start counting from 0 when a packet is stored in an associated one of Buffer 1 to Buffer 3, and each clear the count value when the retransmission controller 230 receives an ACK signal sent from the reception section 102 as a response to the packet. In this case, the packet stored in the buffer associated with the timer having cleared the count value is also cleared. Timer 1 to Timer 3 each have a maximum delay value as a set value of maximum delay which is postulated to occur after a packet is transmitted until an ACK signal is returned, and when a count value counted by any one of Timer 1 to Timer 3 reaches the set value, the retransmission controller 230 recognizes a reception error of a packet stored in a buffer associated with the one of Timer 1 to Timer 3.

In a case where the retransmission controller 230 has recognized a reception error, the retransmission controller 230 shifts to a retransmission phase.

A control procedure of the retransmission phase will be described.

In the retransmission phase, first, supply of a packet, which is generated by the packet generation section 210, to the retransmission section 220 is stopped. In a case where subsequent packets supplied to the retransmission section 220, following the packet of which the reception error is recognized, have already been transmitted at a time point of recognition of the reception error by the retransmission controller 230, the retransmission controller 230 waits until all of the subsequent packets are stored in predetermined associated buffers of the retransmission buffer unit 224. For example, in a case where, after transmission of Packet 1 and simultaneous storing of the same into Buffer 1, the retransmission controller 230 has recognized a reception error of Packet 1 while Packet 2 is being transmitted and stored in Buffer 2, the retransmission controller 230 waits until transmission and storing of the packet 2 are completed.

Next, the retransmission controller 230 reads the packet of which the reception error is recognized from the buffer storing this packet, and retransmits the read packet via the selector 222. For example, in a case where the retransmission controller 230 has recognized a reception error of Packet 1, the retransmission controller 230 reads Packet 1 from Buffer 1, and retransmits the same via the selector 222.

Next, the retransmission controller 230 causes the timer associated with the buffer storing the retransmitted packet to reset the count value and start counting from 0, and waits for an ACK signal to be received from the reception section 102 as a response.

In a case where an ACK signal is received before the timer having started counting reaches the set maximum delay value, the retransmission controller 230 recognizes that the retransmitted packet has been correctly received by the reception section 102. At this time, the retransmission controller 230 clears the count value of the associated timer. Further, the packet stored in a buffer associated with the timer whose count value has been cleared is also cleared according to the response of the ACK signal at the same time.

Note that in a case where a packet has already been stored in the other buffer of the retransmission buffer unit 224, the retransmission controller 230 also waits for an ACK signal with respect to this packet. Then, in a case where no ACK signal is received with respect to this packet, whereby a reception error is recognized, the retransmission controller 230 performs retransmission processing.

In a case where the retransmission controller 230 recognizes that the packets stored in all of the buffers included in the retransmission buffer unit 224 have been correctly received by the reception section 102, the retransmission phase is terminated. After that, the retransmission controller 230 resumes supply of a packet generated by the packet generation section 210 to the retransmission section 220. In any retransmission processing performed in the retransmission phase, unless an ACK signal as a response to a retransmitted packet is received before the timer reaches the set value, retransmission of the packet is repeated.

Figure 3:
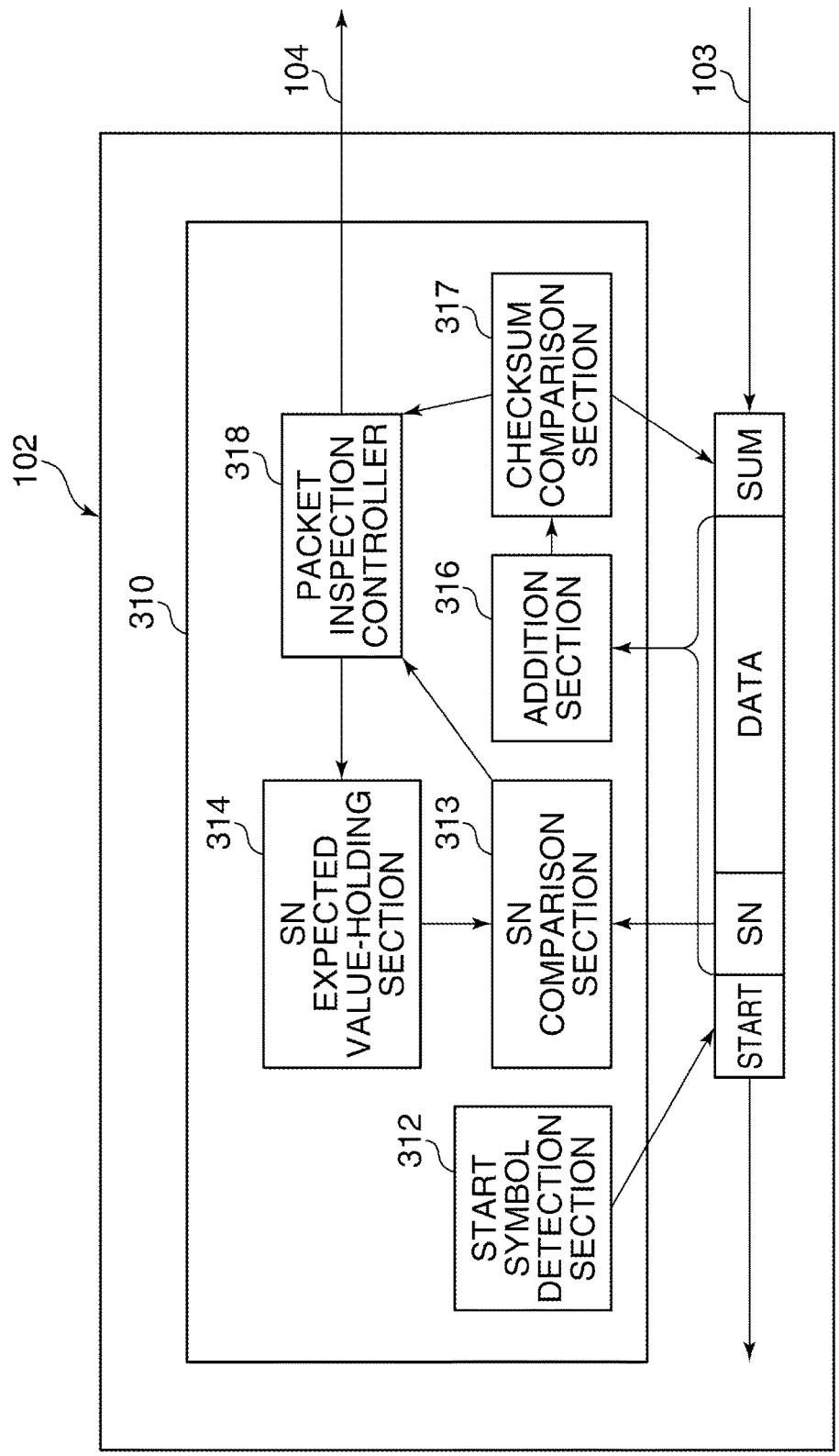
FIG. 3 is a block diagram of a reception section of the transmission and reception system shown in FIG. 1.

FIG. 3 is a block diagram of the reception section 102 of the transmission and reception system 100 shown in FIG. 1.

Reference numeral 310 denotes a packet inspection section that inspects whether or not a packet input thereto has an error caused during transmission on the data transmission line 103.

In the packet inspection section 310, when a start symbol is detected from data input via the data transmission line 103 by a start symbol detection section 312, a data stream following the detected start symbol is regarded as a packet to execute the following packet inspection.

An SN comparison section 313 compares an expected value of a sequence number held by an SN expected value-holding section 314 and a value of the sequence number of the received packet, and determines whether or not the values are equal to each other. As a result of the determination, if the values are equal to each other, the SN comparison section 313 determines that the packet has been correctly received, and sends a notification indicative of OK to a packet inspection controller 318.

An addition section 316 repeatedly adds, to a value of the sequence number set in the packet, a value of each of data segments each having a predetermined size (two bytes in the present embodiment) of the data unit set in the received packet, to thereby calculate a checksum.

A checksum comparison section 317 compares the checksum calculated by the addition section 316 and a checksum added to the packet, and determines whether or not the checksums match. As a result of the determination, if the checksums match, the checksum comparison section 317 sends a notification indicative of OK to the packet inspection controller 318.

In a case where the notifications indicative of OK have been transmitted from both of the SN comparison section 313 and the checksum comparison section 317, the packet inspection controller 318 determines that the packet has been received without any error caused during transmission on the data transmission line 103, i.e., reception of the packet is successful. In this case, the packet inspection controller 318 passes this packet to a downstream block, not shown, and increments the expected value of the sequence number held by the SN expected value-holding section 314. Further, the packet inspection controller 318 delivers an ACK signal to the transmission section 101, which is an external apparatus, via the ACK transmission line 104. As described above, the packet inspection controller 318 increments the expected value of the sequence number held by the SN expected value-holding section 314 whenever it is determined that reception of a packet is successful.

On the other hand, in a case where a notification indicative of OK is not sent from at least one of the SN comparison section 313 and the checksum comparison section 317, the packet inspection controller 318 determines that a packet reception error has occurred. In this case, the packet inspection controller 318 waits for reception of the packet retransmitted via the data transmission line 103 without outputting an ACK signal to the ACK transmission line 104 nor incrementing the expected value of the sequence number held by the SN expected value-holding section 314. After that, when the retransmitted packet is received, the packet inspection controller 318 causes the packet inspection section 310 to execute the same inspection as that described above on the retransmitted packet. Note that, in the present embodiment, the ACK signal output from the packet inspection controller 318 is a pulse wave.

Although in the present embodiment, the packet inspection controller 318 determines whether reception of a packet is successful or a reception error has occurred using the two comparison sections of the SN comparison section 313 and the checksum comparison section 317, this is not limitative. For example, only a result of the determination performed by the SN comparison section 313 may be notified to the transmission section 101 as a notification indicative of occurrence or non-occurrence of a reception error of a packet.

Further, although in the present embodiment, the packet inspection controller 318 outputs an ACK signal in a case where it is determined that packet reception is successful, any other method can be employed insofar as it enables recognition of occurrence or non-occurrence of a reception error with respect to a packet transmitted from the transmission section 101. For example, the packet inspection controller 318 may output an NACK signal in a case where it is determined that a reception error of a packet has occurred.

The transmission and reception system 100 configured as above ensures error-free transfer of a packet as far as the data transmission line 103 is concerned.

Hereafter, a description will be given of a method of eliminating the ineffective state of the protocol for transmission and reception protocol, caused by noise on the ACK transmission line 104.

More specifically, in the present embodiment, first, the description is given of a problem caused in a case where an unnecessary ACK signal is generated due to noise on the ACK transmission line 104. In conjunction with this, there will be described a method of solving this problem, i.e. a method in which on condition that the reception section 102 recognizes a reception error a specified number of consecutive times, the packet inspection controller 318 increments the expected value of the sequence number held by the SN expected value-holding section 314. In the present embodiment, it is assumed that the specified number of times is three.

Figure 4:
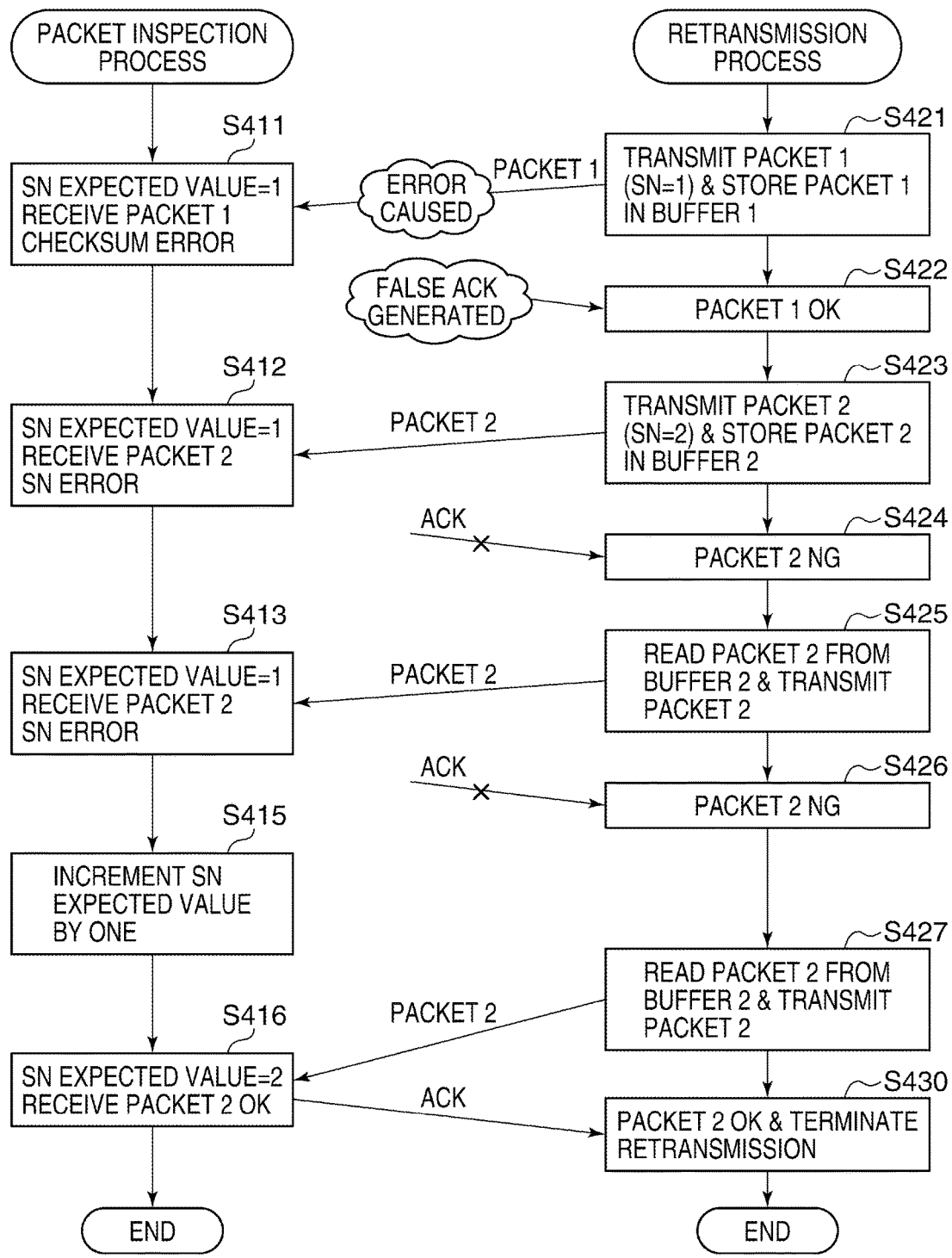
FIG. 4 is a flowchart of a retransmission process and a packet inspection process performed in the first embodiment.

FIG. 4 is a flowchart of a retransmission process performed by the retransmission section 220 and a packet inspection process performed by the packet inspection section 310 in the present embodiment.

Note that the retransmission section 220 is controlled by the retransmission controller 230, and the packet inspection section 310 is controlled by the packet inspection controller 318. The control operation sequences of the retransmission controller 230 and the packet inspection controller 318 are realized by hardware. Although the following description is given of a case where a false ACK signal is generated due to noise on the ACK transmission line 104 even though a packet whose sequence number is 1 has an error caused during transmission on the data transmission line 103, the packet on which these processes are performed is not limited to the packet whose sequence number is 1. That is, the same processes as those in FIG. 4 are performed not only with respect to the packet whose sequence number is 1, but also with respect to a packet having a different sequence number which can be added by the SN generating-and-adding section 214.

The retransmission controller 230 transmits Packet 1 whose sequence number is 1, and stores Packet 1 in Buffer 1 at the same time (step S421). Further, when transmission of Packet 1 is completed, the retransmission controller 230 starts Timer 1.

In the case of the present example, it is assumed that Packet 1 has an error caused during transmission on the data transmission line 103, and hence although the SN comparison section 313 determines that the values of the sequence number are equal to each other, the checksum comparison section 317 of the packet inspection section 310 determines that the checksum calculated from the received Packet 1 and the checksum added to Packet 1 do not match. Therefore, the packet inspection controller 318 determines that a packet reception error has occurred, and neither transmits an ACK signal nor increments the expected value of the sequence number held by the SN expected value-holding section 314 (step S411).

Further, in the case of the present example, it is assumed that noise occurs on the ACK transmission line 104 before Timer 1 reaches the set value, and a false ACK signal is generated, and hence the retransmission controller 230 detects this false ACK signal. That is, the retransmission controller 230 recognizes that Packet 1 has been correctly received (step S422).

The retransmission controller 230 transmits a packet including the next sequence number (Packet 2 in the present example), and stores Packet 2 in Buffer 2 (step S423). Further, when transmission of Packet 2 is completed, the retransmission controller 230 starts Timer 2.

In the reception section 102, the expected value of the sequence number held by the SN expected value-holding section 314 remains unchanged from 1, whereas the sequence number of the received Packet 2 is 2. For this reason, as a result of the comparison between these two values of the sequence number, the SN comparison section 313 determines that the values of the sequence number are not equal to each other, and hence does not send a notification indicative of OK to the packet inspection controller 318. Therefore, the packet inspection controller 318 determines that a packet reception error has occurred, and neither outputs an ACK signal to the ACK transmission line 104 nor increments the expected value of the sequence number held by the SN expected value-holding section 314 (step S412).

Since no ACK signal as a response to the transmitted Packet 2 is received even when the count value of Timer 2 reaches the set value, the retransmission controller 230 recognizes the reception error of Packet 2 (step S424).

The retransmission controller 230 enters the retransmission phase of Packet 2, and retransmits Packet 2 stored in Buffer 2 (step S425). Further, when retransmission of the packet 2 is completed, the retransmission controller 230 causes Timer 2 to restart counting from 0.

In the reception section 102, the sequence number of the retransmitted Packet 2 is 2, whereas the expected value of the sequence number held by the SN expected value-holding section 314 remains unchanged from 1. For this reason, similar to the step S412, as a result of the comparison between these two values of the sequence number, the SN comparison section 313 determines that the values of the sequence number are not equal to each other, and hence does not send a notification indicative of OK to the packet inspection controller 318. Therefore, the packet inspection controller 318 determines that a packet reception error has occurred, and neither outputs an ACK signal to the ACK transmission line 104 nor increments the expected value of the sequence number held by the SN expected value-holding section 314 (step S413).

Since no ACK signal as a response to the retransmitted Packet 2 is received even when the count value of Timer 2 having restarted counting reaches the set value, the retransmission controller 230 recognizes the reception error of Packet 2, similar to the step S424 (step S426).

This state is deadlock in which while the transmission section 101 repeats retransmission of Packet 2, the reception section 102 waits for retransmission of Packet 1, and is a serious error state.

To break this deadlock, in a case where the packet inspection controller 318 recognizes a packet reception error three consecutive times, the packet inspection controller 318 increments the expected value of the sequence number held by the SN expected value-holding section 314 (step S415). Here, in the reception section 102, the packet reception error has been recognized three consecutive times in the respective steps S411, S412, and S413 in FIG. 4. Therefore, the packet inspection controller 318 increments the expected value of the sequence number held by the SN expected value-holding section 314. As a result, the expected value of the sequence number held by the SN expected value-holding section 314 is changed to 2.

The retransmission controller 230 having recognized the reception error of Packet 2 in the step S426 retransmits Packet 2 stored in Buffer 2 again, similar to the step S425 (step S427), i.e. transmits the same for the third time. Further, when the third transmission of Packet 2 is completed, the retransmission controller 230 causes Timer 2 to start counting from 0 for the third time.

The reception section 102 receives Packet 2 whose sequence number is 2, and the expected value of the sequence number held by the SN expected value-holding section 314 has been incremented to 2 in the step S415. Therefore, in a step S416, the SN comparison section 313 determines that the values of the sequence number are equal to each other and the checksum comparison section 317 determines that the checksums match, so that they each send a notification indicative of OK to the packet inspection controller 318. Therefore, the packet inspection controller 318 determines that Packet 2 has been correctly received, and outputs an ACK signal to the ACK transmission line 104, followed by terminating the packet inspection process.

The retransmission controller 230 receives the ACK signal as a response before Timer 2 having started counting for the third time reaches the set value, recognizes success of reception of Packet 2 by the reception section 102, clears Timer 2, and terminates the retransmission phase (step S430), followed by terminating the retransmission process.

In the case of the present embodiment, although Packet 1 is not received by the reception section 102 and hence loss of the same results, the deadlock is broken, which enables subsequent packets to be transmitted and received. After the ineffective state of the protocol for transmission and reception, described with reference to FIGS. 2 and 3, is eliminated by performing the processes in FIG. 4, packet transmission and reception in the transmission and reception system 100 are performed according to the protocol for transmission and reception. Note that, in the present embodiment, after detecting (recognizing) the packet reception error three consecutive times, the packet inspection controller 318 increments the expected value of the sequence number. However, the number of consecutive times of detection (recognition) of the packet reception error by the packet inspection controller 318 is not limited to three, but it may be any plural number.

Next, a description will be given of a second embodiment of the present invention, which employs another method of eliminating the ineffective state of the protocol for transmission and reception protocol, caused by noise on the ACK transmission line 104.

More specifically, in the present embodiment, similar to the first embodiment, a problem caused in a case where an unnecessary ACK signal is generated due to noise on the ACK transmission line 104 is solved. The method of solving the problem according to the second embodiment is distinguished from the method in the first embodiment in that when the transmission section 101 recognizes a reception error a specified number of consecutive times (three consecutive times in the embodiment), packet retransmission is started with a packet which has been transmitted immediately before the packet causing the reception error.

For this reason, although in the first embodiment, when the count value of a timer is cleared according to the response of an ACK signal, a packet stored in a buffer associated with the timer is also cleared, in the present embodiment, the transmission section 101 continues to hold the packet in the buffer until an ACK signal as a response to a packet transmitted next to the packet is received.

Figure 5:
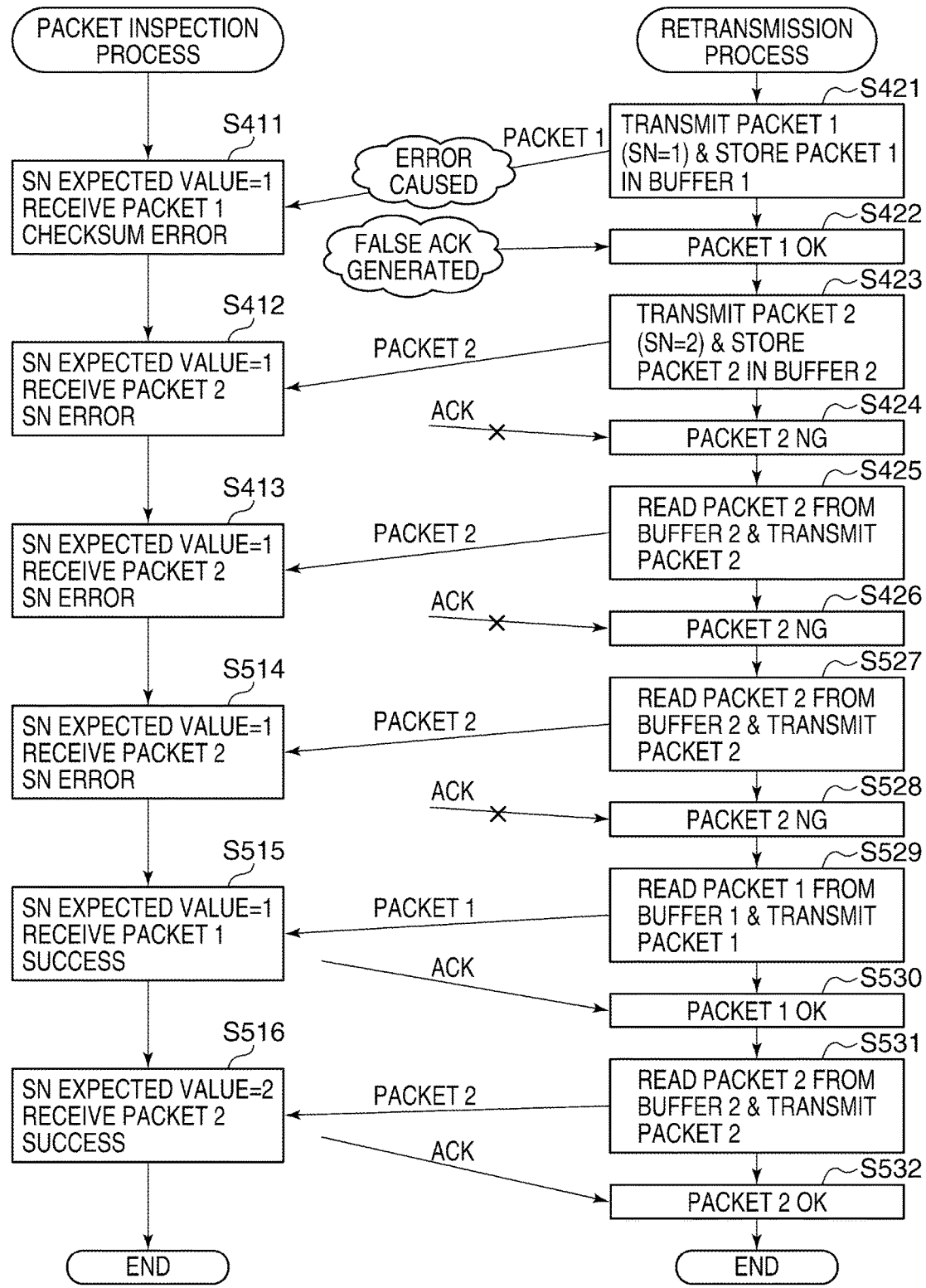
FIG. 5 is a flowchart of a retransmission process and a packet inspection process performed in a second embodiment of the present invention.

FIG. 5 is a flowchart of a retransmission process performed by the retransmission section 220 and a packet inspection process performed by the packet inspection section 310 in the present embodiment.

Referring to FIG. 5, the steps S411 to S413 executed by the packet inspection controller 318, and the steps S421 to S426 executed by the retransmission controller 230 are the same as those in FIG. 4, and hence a detailed description thereof is omitted. However, a simple description thereof is as follows: Similar to the described example of the first embodiment, deadlock is caused in which after transmitting Packet 1, the transmission section 101 receives a false ACK signal as a response thereto, and hence the transmission section 101 repeats retransmission of Packet 2, but the reception section 102 waits for Packet 1.

In this example described for the second embodiment, to solve this deadlock, processing operations are performed as follows: The retransmission controller 230 having recognized the reception error of Packet 2 in the step S426 retransmits Packet 2 stored in Buffer 2 again in a step S527, similar to the step S425, i.e. transmits the same for the third time. Further, when this second retransmission of Packet 2 is completed, the retransmission controller 230 causes Timer 2 to restart counting from 0 again.

In the reception section 102, similar to the step S413, as a result of the comparison between these two sequence numbers, the SN comparison section 313 determines that the values of the sequence number are not equal to each other, and hence does not send a notification indicative of OK to the packet inspection controller 318. Therefore, the packet inspection controller 318 determines that a packet reception error has occurred, and neither outputs an ACK signal to the ACK transmission line 104 nor increments the expected value of the sequence number held by the SN expected value-holding section 314 (step S514).

The retransmission controller 230 recognizes the reception error of Packet 2 (step S528), similar to the step S426.

In the step S528, the retransmission controller 230 recognizes the reception error of Packet 2. Thus, in succession to the steps S424 and S426, the reception error is similarly recognized, resulting recognition of a total of three consecutive times of occurrence of the reception error, and hence the retransmission controller 230 changes a packet to be retransmitted from Packet 2 stored in Buffer 2 to Packet 1 stored in Buffer 1, and delivers Packet 1 (step S529). Further, when transmission of Packet 1 is completed, the retransmission controller 230 causes Timer 1 to start counting.

The reception section 102 receives Packet 1 which has been waited for, and hence the expected value of the sequence number held by the SN expected value-holding section 314 and the value of the sequence number of the received packet become equal to each other. Therefore, the packet inspection controller 318 transmits an ACK signal as a response, and increments the expected value of the sequence number held by the SN expected value-holding section 314 (step S515). As a result, the expected value of the sequence number held by the SN expected value-holding section 314 is changed to 2.

Upon receipt of the ACK signal as a response before the count value of Timer 1 reaches the set value, recognizes success of reception of Packet 1, and the transmission controller 230 clears Timer 1 (step S530).

Next, the retransmission controller 230 enters the retransmission phase, and retransmits Packet 2 stored in Buffer 2 (step S531). Further, when retransmission of Packet 2 is completed, the retransmission controller 230 causes Timer 2 to start counting.

The reception section 102 receives Packet 2. The expected value of the sequence number held by the SN expected value-holding section 314 and the sequence number of the received packet are both 2, and i.e. equal to each other. Therefore, the packet inspection controller 318 transmits an ACK signal as a response, and increments the expected value of the sequence number held by the SN expected value-holding section 314 (step S516), followed by terminating the packet inspection process. As a result, the expected value of the sequence number held by the SN expected value-holding section 314 is changed to 3.

The transmission controller 230 receives the ACK signal as a response before the count value of Timer 2 reaches the set value, recognizes success of reception of Packet 2, clears Timer 2, and terminates the retransmission phase (step S532), followed by terminating the retransmission process.

By using the above-described method, in the present embodiment, it is possible to break the deadlock. The method of the present embodiment is more advantageous than that of the first embodiment in that, in the case of the described example, both of Packet 1 and Packet 2 are correctly received by the reception section 102, and hence there is no packet loss. Note that after the ineffective state of the protocol for transmission and reception is eliminated by performing the processes in FIG. 5, packet transmission and reception in the transmission and reception system 100 are performed according to the protocol for transmission and reception, described with reference to FIGS. 2 and 3.

Next, a description will be given of a third embodiment of the present invention, which employs another method of eliminating the ineffective state of the protocol for transmission and reception protocol, caused by noise on the ACK transmission line 104.

More specifically, in the present embodiment, first, the description is given of a problem caused in a case where the retransmission controller 230 could not recognize an ACK signal due to noise on the ACK transmission line 104. In conjunction with this, there will be described a method of solving this problem, i.e. a method in which on condition that the reception section 102 recognizes a reception error a specified number of consecutive times, the packet inspection controller 318 decrements the expected value of the sequence number held by the SN expected value-holding section 314. In the present embodiment, it is assumed that the specified number of consecutive times is three.

Figure 6:
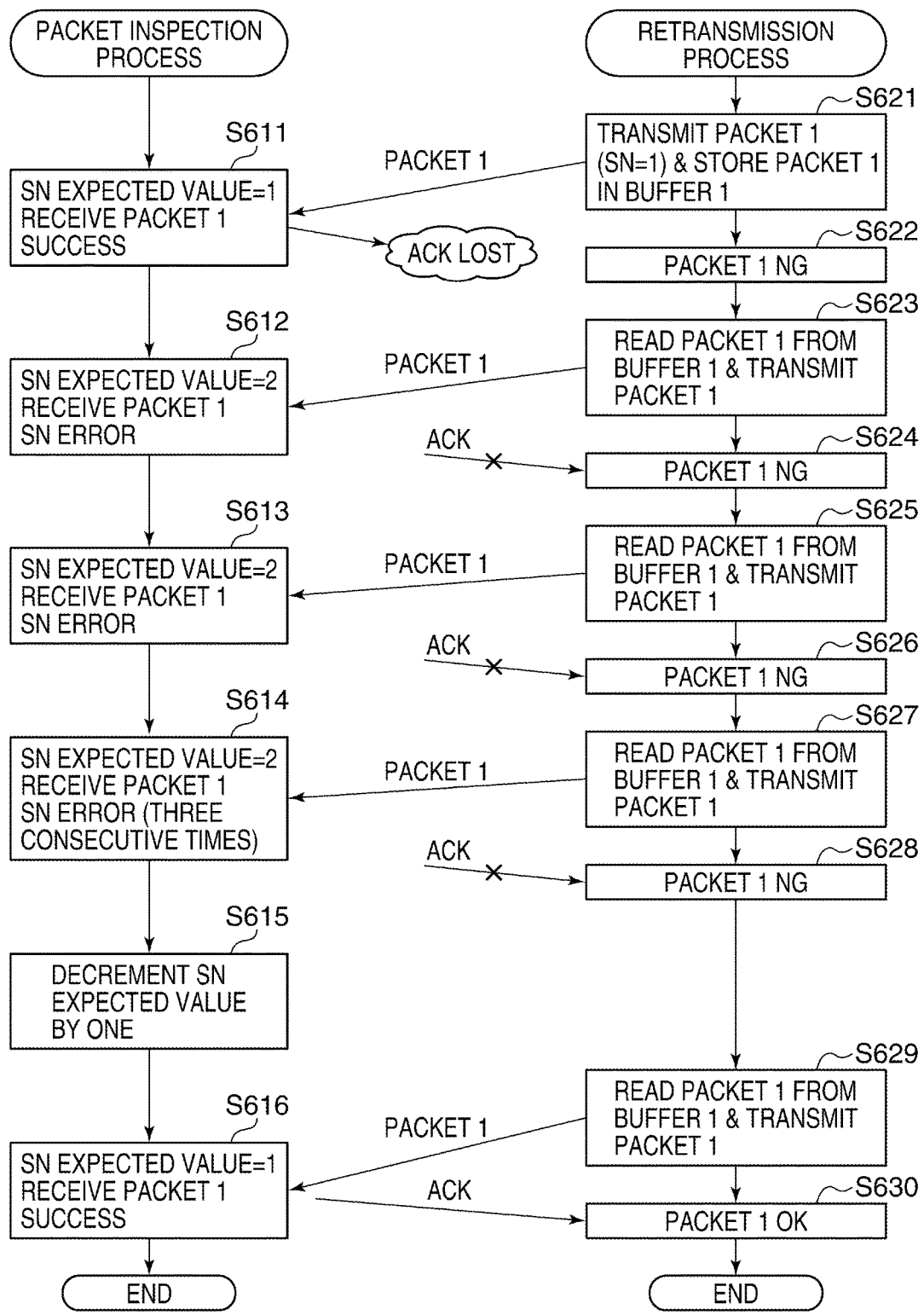
FIG. 6 is a flowchart of a retransmission process and a packet inspection process performed in a third embodiment of the present invention.

FIG. 6 is a flowchart of a retransmission process performed by the retransmission section 220 and a packet inspection process performed by the packet inspection section 310 in the present embodiment.

The following description is given of a case where although Packet 1 has been correctly received via the data transmission line 103, and an ACK signal has been output from the reception section 102, the transmission section 101 could not recognize the ACK signal due to noise on the ACK transmission line 104. However, the packet on which these processes are performed is not limited to the packet whose sequence number is 1. That is, the same processes as those in FIG. 6 are performed not only with respect to the packet whose sequence number is 1, but also with respect to a packet having a different sequence number which can be added by the SN generating-and-adding section 214.

The retransmission controller 230 transmits Packet 1 whose sequence number is 1, and stores Packet 1 in Buffer 1 at the same time (step S621). Further, when transmission of Packet 1 is completed, the retransmission controller 230 causes Timer 1 to start counting.

In the case of the present example, since Packet 1 is transmitted via the data transmission line 103 without an error, and hence the SN comparison section 313 determines that the values of the sequence number are equal to each other, and the checksum comparison section 317 determine that the checksum calculated from the received Packet 1 and the checksum added to Packet 1 match. Therefore, the packet inspection controller 318 determines that the reception is successful, outputs an ACK signal to the ACK transmission line 104, and increments the expected value of the sequence number held by the SN expected value-holding section 314 (step S611).

Further, in the case of the present example, it is assumed that the retransmission controller 230 could not recognize the ACK signal output in the step S611 due to noise on the ACK transmission line 104, and hence the count value of Timer 1 reaches the set value in a state in which the ACK signal as a response to Packet 1 has not been received. Therefore, the retransmission controller 230 recognizes the reception error of Packet 1 (step S622).

The retransmission controller 230 enters the retransmission phase of Packet 1, and retransmits Packet 1 stored in Buffer 1 (step S623). Further, when retransmission of the packet 1 is completed, the retransmission controller 230 causes Timer 1 to restart counting from 0.

In the reception section 102, the sequence number of the retransmitted Packet 1 is 1, whereas the expected value of the sequence number held by the SN expected value-holding section 314 is 2. Therefore, as a result of the comparison between these two values of the sequence number, the SN comparison section 313 determines that the values of the sequence number are not equal to each other, and hence does not send a notification indicative of OK to the packet inspection controller 318. Therefore, the packet inspection controller 318 determines that a packet reception error has occurred, and neither outputs an ACK signal to the ACK transmission line 104 nor increments the expected value of the sequence number held by the SN expected value-holding section 314 (step S612).

Since no ACK signal as a response to the retransmitted Packet 1 is received even when the count value of Timer 1 having started counting again reaches the set value, the retransmission controller 230 recognizes the reception error of Packet 1 (step S624).

After that, the same processing operations for retransmitting the packet and recognizing a reception error, as those described in the steps S623, S612, and S624 are further repeated two times. That is, for the second time, the packet is retransmitted in a step S625, occurrence of a reception error is determined in a step S613, and the retransmission controller 230 recognizes the reception error in a step S626. For the third time, the packet is retransmitted in a step S627, occurrence of a reception error is determined in a step S614, and the retransmission controller 230 recognizes the reception error in a step S628.

This state is deadlock in which while the transmission section 101 repeats retransmission of Packet 1, the reception section 102 waits for retransmission of Packet 2, and is a serious error state.

To break this deadlock, in a case where the packet inspection controller 318 recognizes a packet reception error three consecutive times, the packet inspection controller 318 decrements the expected value of the sequence number held by the SN expected value-holding section 314 (step S615). As a result, the expected value of the sequence number held by the SN expected value-holding section 314 is changed to 1.

The retransmission controller 230 having recognized the reception error of Packet 1 in the step S628 retransmits Packet 1 stored in Buffer 1 (step S629). Further, when retransmission of Packet 1 is completed, the retransmission controller 230 causes Timer 1 to start counting from 0.

The reception section 102 receives Packet 1 whose sequence number is 1, and the expected value of the sequence number held by the SN expected value holding section 314 has been decremented and changed to 1 in the step S615. Therefore, in a step S616, the SN comparison section 313 determines that the values of the sequence number are equal to each other and the checksum comparison section 317 determines that the checksums match, so that they each send a notification indicative of OK to the packet inspection controller 318. That is, the packet inspection controller 318 determines that Packet 1 has been correctly received, and outputs an ACK signal to the ACK transmission line 104, followed by terminating the packet inspection process.

The retransmission controller 230 receives the ACK signal as a response before Timer 1 having started counting reaches the set value, recognizes success of reception of Packet 1, clears Timer 1, and terminates the retransmission phase (step S630), followed by terminating the retransmission process.

According to the present embodiment, although redundant reception of Packet 1 by the reception section 102 results, the deadlock is broken, which enables subsequent packets to be transmitted and received. Note that after the ineffective state of the protocol for transmission and reception is eliminated by performing the process in FIG. 6, packet transmission and reception in the transmission and reception system 100 are performed according to the protocol for transmission and reception, described with reference to FIGS. 2 and 3.

Next, a description will be given of a fourth embodiment of the present invention, which employs another method of eliminating the ineffective state of the protocol for transmission and reception protocol, caused by noise on the ACK transmission line 104.

More specifically, in the present embodiment, similar to the third embodiment, the description is given of a problem caused in a case where the retransmission controller 230 could not recognize an ACK signal due to noise on the ACK transmission line 104. The method of solving the problem according to the fourth embodiment is distinguished from the method in the third embodiment in that when the reception section 102 recognizes a reception error a specified number of consecutive times, the packet inspection controller 318 transmits an ACK signal as a response. In the present embodiment, it is assumed that the specified number of consecutive times is three.

Figure 7:
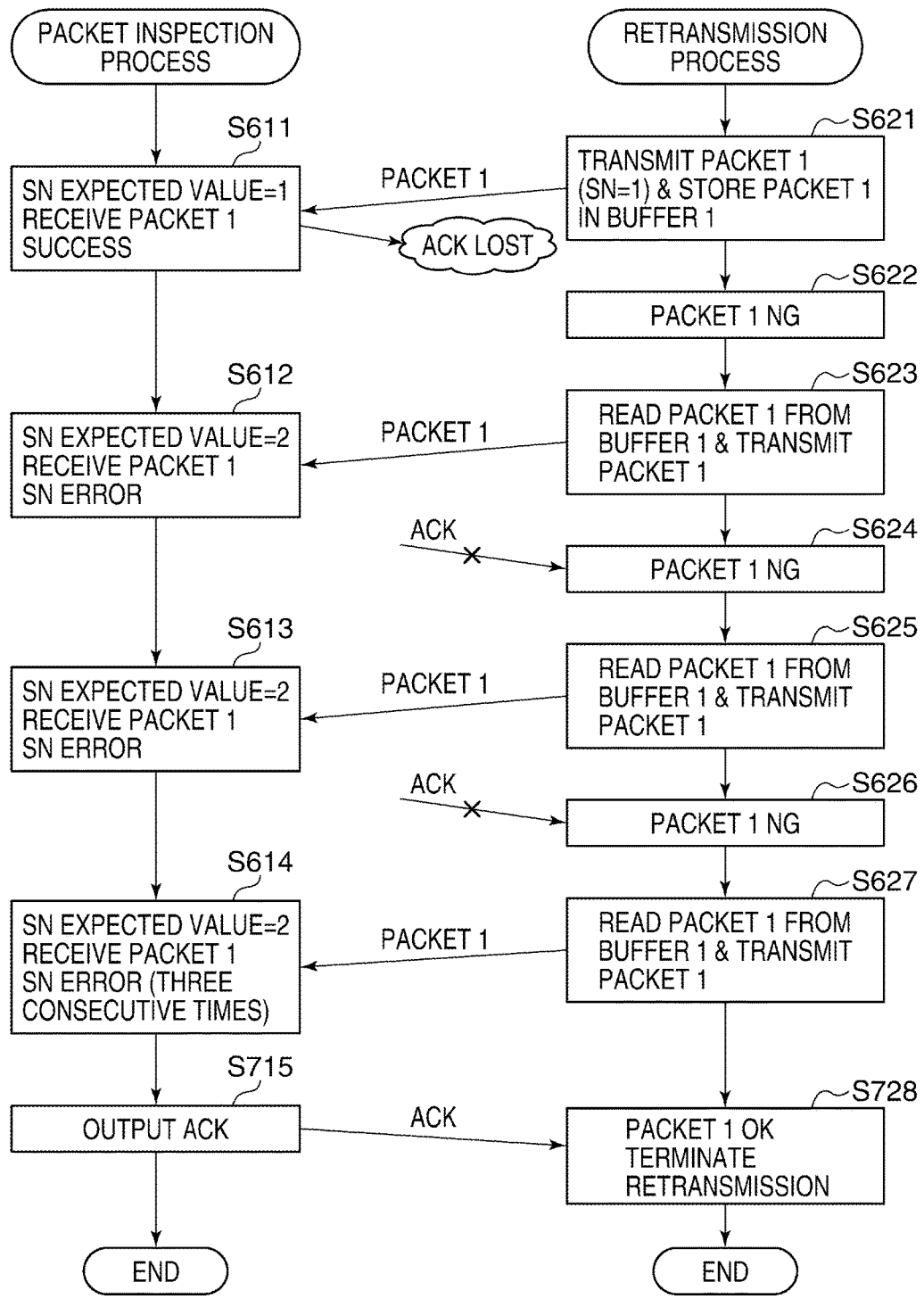
FIG. 7 is a flowchart of a retransmission process and a packet inspection process performed in a fourth embodiment of the present invention.

FIG. 7 is a flowchart of a retransmission process performed by the retransmission section 220 and a packet inspection process performed by the packet inspection section 310 in the present embodiment.

Referring to FIG. 7, the steps S611 to S614 executed by the packet inspection controller 318, and the steps S621 to S627 executed by the retransmission controller 230 are the same as those in FIG. 6, and hence a detailed description thereof is omitted.

However, a simple description thereof is as follows: Similar to the third embodiment, deadlock is caused in which after transmitting Packet 1, an ACK signal as a response thereto cannot be recognized due to noise, and hence the transmission section 101 recognizes reception error of Packet 1 and repeats retransmission of Packet 1, but the reception section 102 waits for Packet 2.

To break this deadlock, in a case where a packet reception error occurs three consecutive times, the packet inspection controller 318 outputs an ACK signal to the ACK transmission line 104 without changing the expected value of the sequence number held by the SN expected value-holding section 314 (step S715). After that, the packet inspection controller 318 terminates the packet inspection process.

The retransmission controller 230 receives the ACK signal as a response before Timer 1 having started counting reaches the set value, recognizes success of reception of Packet 1, clears Timer 1, and terminates the retransmission phase (step S728), followed by terminating the retransmission process.

The processes for breaking the deadlock are described as above. The present embodiment is more advantageous than the first embodiment in that in the case of the described example, Packet 1 is not redundantly received. Note that after the ineffective state of the protocol for transmission and reception is eliminated by performing the processes in FIG. 7, packet transmission and reception in the transmission and reception system 100 are performed according to the protocol for transmission and reception, described with reference to FIGS. 2 and 3.

In both of the first and third embodiments of the present invention, the expected value of the sequence number (SN) held by the SN expected value-holding section 314 is changed so as to break the deadlock caused by determination that the value of the sequence number of a retransmitted packet and the expected value of the sequence number held by the SN expected value-holding section 314 are not equal to each other. More specifically, in the first embodiment, the expected value of the sequence number is incremented, whereas in the third embodiment, the expected value of the sequence number is decremented. In contrast, in a fifth embodiment of the present invention, the expected value of the sequence number held by the SN expected value-holding section 314 is changed to a value of the sequence number of a received packet with respect to which a reception error is recognized.

Figure 8:
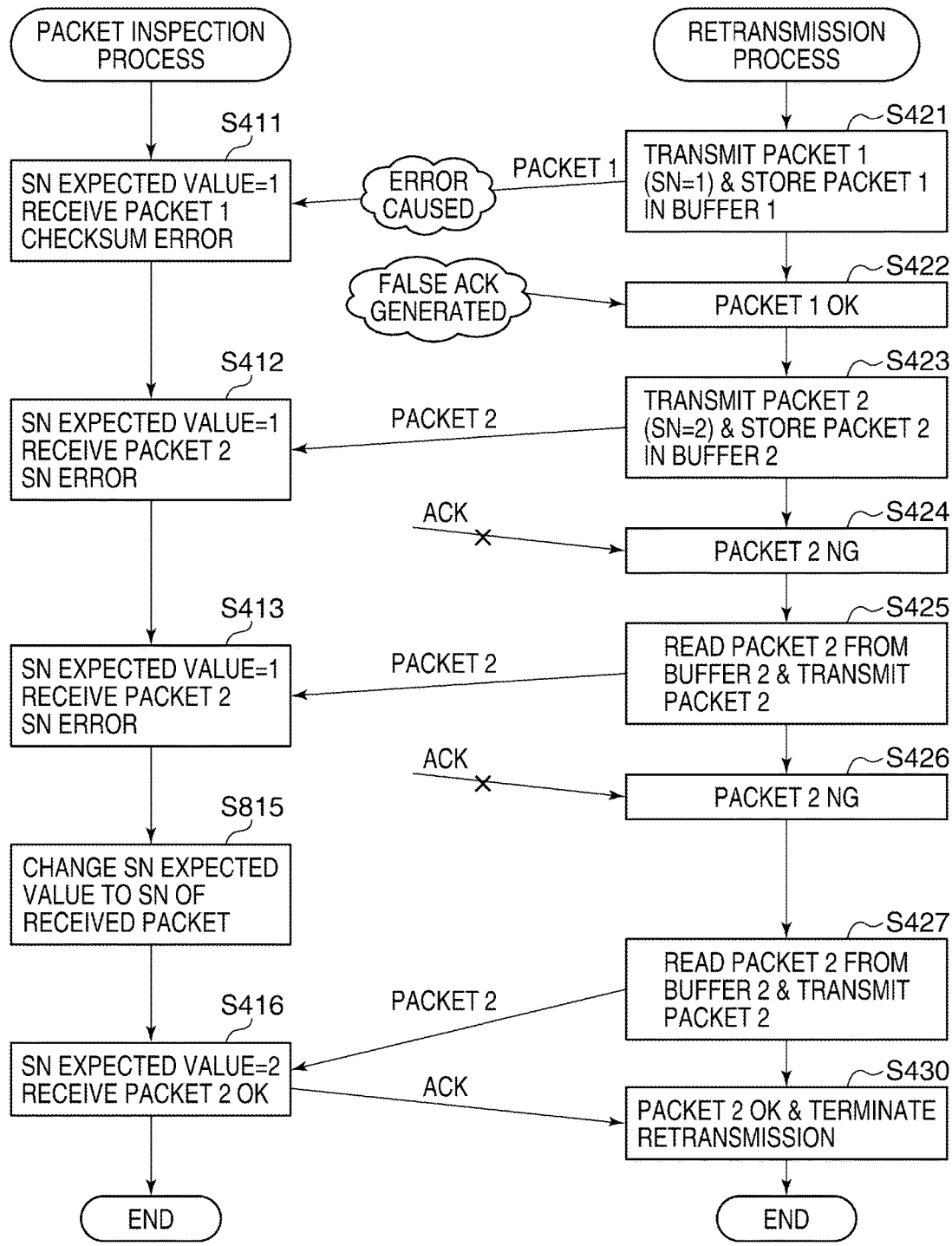
FIG. 8 is a flowchart of a retransmission process and a packet inspection process performed in a fifth embodiment of the present invention.

FIG. 8 is a flowchart of a retransmission process performed by the retransmission section 220 and a packet inspection process performed by the packet inspection section 310 in the present embodiment.

The flowchart shown in FIG. 8 is different from that in FIG. 4 with reference to which the first embodiment is described, only in a step S815.

After the packet inspection section 310 determines occurrence of a packet reception error for the third consecutive time in the step S413, the packet inspection section 310 changes the expected value of the sequence number held by the SN expected value-holding section 314 to the sequence number of the received packet, in the step S815. That is, the expected value of the sequence number held by the SN expected value-holding section 314 is changed to 2.

This breaks the deadlock, similarly to the case of the first embodiment.

This method of breaking deadlock is also effective for a case where the ACK signal is lost due to noise on the ACK transmission line 104, and the expected value of the sequence number held by the SN expected value-holding section 314 becomes larger than the sequence number of the transmitted packet by one, as in the third embodiment. Note that after the ineffective state of the protocol for transmission and reception is eliminated by performing the processes in FIG. 8, packet transmission and reception in the transmission and reception system 100 are performed according to the protocol for transmission and reception, described with reference to FIGS. 2 and 3.

The plurality of methods of solving the problem, i.e. methods of breaking the deadlock have been described.

Although in the above-described embodiments, the transmission section 101 recognizes a reception error of a transmitted packet in a case where no ACK signal is received as a response, the transmission section 101 may recognize a packet reception error in a case where a signal indicative of an error, such as an NACK signal, is received.

Further, depending on how an ACK signal is implemented, in some cases, the ACK signal is liable to be unnecessarily generated, and in other cases, the ACK signal is liable to be lost. Therefore, it is desirable to select a suitable method of solving the problem, depending on the cases. For example, in a case where the ACK signal is a pulse signal transmitted via a single transmission line, an unnecessary signal is liable to be generated due to noise, and in a case where the ACK signal is a signal transmitted as a combination of specified signals or a code, the combination or the code is liable to be broken and lost due to noise.

Further, the above-described plurality of methods of solving the problem may be combined.

For example, the method of breaking deadlock may be selectively used according to a relationship between an expected value of the sequence number held by the SN expected value-holding section 314 and a value of the sequence number of a retransmitted packet. For example, if the expected value of the sequence number held by the SN expected value-holding section 314 is smaller than the value of the sequence number of the retransmitted packet, the method described in the second embodiment may be used, whereas if the expected value of the same is larger than the value of the sequence number of the retransmitted packet, the method described in the fourth embodiment may be used. This makes it possible to realize the transmission and reception system 100 which is free from packet loss and redundant packet transmission, even against an error of the ACK transmission line 104.

Other Embodiments

Although the embodiments were described in detail, the present invention can be realized in various forms, including a system, an apparatus, a method, a program, and a storage medium (recording medium). For example, the present invention can be applied to a system formed by a plurality of devices, or an apparatus formed by one device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention may be realized by any other form, such as an object code, a program executed by an interpreter, and script data supplied to an OS, insofar as it has a program function.

Further, as a method of supplying the program, the program can be supplied by downloading from a website on the Internet to a recording medium, such as a hard disk, using a browser of a client computer. That is, for example, by connecting to the website, the computer program itself of the present invention or a compressed file including an automatic installation function is downloaded from the website. Further, it is also possible to realize the present invention, by dividing the program code forming the program of the present invention into a plurality of files, and downloading each divided file from difference websites. That is, a WWW server that allows a plurality of users to download the program files for realizing the processing function of the present invention on a computer is also included in the present invention.

Further, the program of the present invention is encrypted and stored in a storage medium, such as a CD-ROM, and is distributed to a user. Then, a user who satisfied a predetermined condition is allowed to download key information for decoding the program, from the website, via the Internet. Then the present invention can be realized by executing the encrypted program using the key information to thereby install the program.

Further, the functions of the above-described embodiments are realized by a computer executing the read program. Alternatively, an OS or the like operating on the computer may perform part or all of actual processing based on instructions of the program, thereby realizing the functions of the above-described embodiments.

Further, the functions of the above-described embodiments can also be realized after the program read from the recording medium is written into a memory provided in a function extension board inserted in the computer or a function extension unit connected to the computer. That is, the functions of the above-described embodiments can be realized by a CPU or the like provided in the function extension board or the function extension unit, which performs part or all of actual processing based on instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-192737 filed Oct. 2, 2017, which is hereby incorporated by reference herein in its entirety.

What is claimed is:

1. An information processing apparatus comprising:
a transmission module that transmits a data block including data and a sequence number; and
a reception module that receives the data block transmitted from the transmission module,
wherein the reception module comprises:
a storage unit that stores an expected value of the sequence number; and
a control unit that changes the expected value stored in the storage unit to a next value and transmits a predetermined response to the transmission module, in a case where a result of comparison between the expected value stored in the storage unit and a value of the sequence number included in the data block received from the transmission module satisfies a first predetermined condition,
wherein the transmission module comprises:
a reception unit that receives the predetermined response; and
a transmission unit that:
transmits a data block including a next sequence number in a case where the predetermined response is received by the reception unit; and
retransmits the data block including the sequence number in a case where the predetermined response is not received by the reception unit, and
wherein the control unit changes the expected value stored in the storage unit to the next value without transmitting the predetermined response to the transmission module, in a case where the result of comparison between the expected value stored in the storage unit and the value of the sequence number included in the data block received from the transmission module does not satisfy the first predetermined condition.

2. The information processing apparatus according to claim 1, wherein the expected value stored in the storage unit is a value expected as the value of the sequence number included in the data block received from the transmission module.

3. The information processing apparatus according to claim 1 wherein:
the predetermined response is a notification to the transmission unit indicating that the data block including the sequence number is received from the transmission module without an error, and
the transmission unit retransmits the data block including the sequence number, in a case where the notification is not received by the reception unit even when a predetermined time period elapses after transmission of the data block including the sequence number.

4. The information processing apparatus according to claim 3, wherein:
the transmission module further comprises a measurement unit that measures time elapsed after the transmission of the data block including the sequence number, and
the transmission unit retransmits the data block including the sequence number, based on the time measured by the measurement unit.

5. The information processing apparatus according to claim 3, wherein the transmission module further comprises another storage unit that stores a plurality of data blocks already transmitted, which respectively include different sequence number, and retransmits, among the plurality of data blocks already transmitted, the data block including the sequence number and data blocks transmitted thereafter in a case where the notification is not received by the reception unit even when the predetermined time period elapses after transmission of the data block including the sequence number.

6. The information processing apparatus according to claim 1, wherein the control unit does not change the expected value stored in the storage unit, in a case where the number of times the result of comparison between the expected value stored in the storage unit and the value of the sequence number included in the data block received from the transmission module satisfies the first predetermined condition does not reach the predetermined number of times.

7. The information processing apparatus according to claim 1, wherein the transmission module and the reception module are modules implemented in an ASIC (Application Specific Integrated Circuit) respectively.

8. The information processing apparatus according to claim 1, wherein:
the transmission module further comprises an adding unit that adds a checksum to the data block to be transmitted, and
the control unit does not change the expected value stored in the storage unit, in a case where the result of comparison between the expected value stored in the storage unit and the value of the sequence number included in the data block received from the transmission module satisfies the first predetermined condition, but a result of comparison between a checksum calculated from data in the data block transmitted from the transmission module and the added checksum does not satisfy a second predetermined condition.

9. The information processing apparatus according to claim 1, wherein:
the data block to be transmitted by the transmission module includes a checksum, and the control unit changes the expected value stored in the storage unit to a next value and transmits a predetermined response to the transmission module, in a case where the result of comparison between the expected value stored in the storage unit and the value of the sequence number included in the data block received from the transmission module satisfies the first predetermined condition, and a result of comparison between a checksum calculated from data in the data block transmitted from the transmission module and the checksum included in the data block satisfies a second predetermined condition.

10. A method of controlling an information processing apparatus, the method comprising:
   transmitting, using a transmission module, a data block including data and a sequence number;
   receiving, using a reception module, the transmitted data block;
   storing, in a storage unit of the reception module, an expected value of the sequence number;
   changing the stored expected value to a next value and transmitting a predetermined response to the transmission module using the reception module, in a case where a result of comparison between the stored expected value and a value of the sequence number included in the received data block satisfies a first predetermined condition;
   receiving, using the transmission module, the predetermined response;
   transmitting, using the transmission module, a data block including a next sequence number in a case where the predetermined response is received by the transmission module;
   retransmitting, using the transmission module, the data block including the sequence number in a case where the predetermined response is not received by the transmission module; and
   changing, using the reception module, the expected value stored in the storage unit to the next value without transmitting the predetermined response to the transmission module, in a case where the result of comparison between the expected value stored in the storage unit and the value of the sequence number included in the data block received from the transmission module does not satisfy the first predetermined condition.

* * * * *